United States Patent [19]

Takahashi et al.

[11] 4,167,582
[45] Sep. 11, 1979

[54] MAGNETIC METALLIC POWDER CONTAINING IRON AND MAGNETIC RECORDING MEDIUM USING SAME POWDER

[75] Inventors: Noboru Takahashi; Sadao Ozaki; Tunehide Naruse; Hiromasa Isono; Toshikazu Nishihara, all of Yokohama, Japan

[73] Assignee: Victor Company of Japan, Limited, Yokohama, Japan

[21] Appl. No.: 828,034

[22] Filed: Aug. 26, 1977

[30] Foreign Application Priority Data

Aug. 27, 1976 [JP] Japan ............................. 51-101576

[51] Int. Cl.$^2$ .................. H01F 1/08; B32B 15/02; B32B 15/18
[52] U.S. Cl. ........................... 428/328; 252/62.55; 252/62.56; 274/41 A; 428/457; 428/539; 428/900
[58] Field of Search ............... 252/62.55, 62.62, 62.56; 428/900, 539, 457, 328; 274/41 A, 42 R, 43

[56] References Cited

U.S. PATENT DOCUMENTS

| | | | |
|---|---|---|---|
| 3,958,064 | 5/1976 | Brekken et al. | 428/900 X |
| 3,973,072 | 8/1976 | Anderson et al. | 428/900 X |
| 3,977,985 | 8/1976 | Umeki et al. | 252/62.55 |
| 4,020,236 | 4/1977 | Aonuma et al. | 428/900 X |
| 4,032,682 | 6/1977 | Masson | 428/900 X |
| 4,063,000 | 12/1977 | Aonuma et al. | 428/900 X |
| 4,069,073 | 1/1978 | Tadokoro et al. | 252/62.55 X |
| 4,069,367 | 1/1978 | Umeki et al. | 252/62.56 X |
| 4,074,002 | 2/1978 | Hack et al. | 428/900 X |
| 4,125,474 | 11/1978 | Dezawa et al. | 252/62.62 |

FOREIGN PATENT DOCUMENTS

1395704  5/1975  United Kingdom ..................... 428/900

Primary Examiner—Harold Ansher
Attorney, Agent, or Firm—Fleit & Jacobson

[57] ABSTRACT

A magnetic metallic powder which is essentially of iron or its alloy with at least one other metal and features a good resistance to oxidation by air as well as a large value for saturation magnetization is obtained by the reduction of an oxide powder prepared or treated in a basic liquid phase environment the oxide powder ultimately to have a pH value not smaller than 6.0. A magnetic recording medium consisting of a nonmagnetic base and a thin magnetic layer comprising the metallic powder dispersed in a polymer binder serves for high density recording purposes and long retains its excellent physical properties.

26 Claims, 3 Drawing Figures

MAGNETIC METALLIC POWDER CONTAINING IRON AND MAGNETIC RECORDING MEDIUM USING SAME POWDER

This invention relates to a magnetic powder which comprises iron and may optionally comprises at least one other metal and a magnetic recording medium which utilizes this powder as the essential material of a magnetic coating.

Elaborate research and development works have long been pursued for the use of a finely divided powder of iron or its alloy with one or more other metal(s) typified by cobalt and/or nickel in magnetic recording media of the type consisting of a nonmagnetic base coated with a thin layer of a ferromagnetic material, recently with an increasing interest as particularly promising material for the recording media of a high density recording service.

In this application a powder of iron or its alloy mentioned above will be designated under the name of "metallic powder" because, as is commonly recognized, the powder practically always contains a certain amount of oxygen in the form of oxide, and "iron" alone will be mentioned as the essential component of the metallic powder or its material throughout the description, omitting the mentioning of "iron alloy" except where the alloys are a matter of particular concern.

A finely divided iron powder useful as a ferro-magnetic material for recording use can be obtained by the reduction of a powder of an oxide of iron such as ferric oxide prepared in the form of fine particles. There are a variety of methods for the preparation of the oxide particles, but nowadays a process, in which fine particles of a hydroxide or a mixture of an oxide and a hydroxide precipitated through a solution reaction are converted into an oxide by a dehydrogenation procedure such as a heat treatment, is almost exclusively put into practice in the production of metallic powders for the magnetic recording use. Usually the formation and growth of the hydroxide particles are accomplished in an acidic solution. For example, goethite is caused to precipitate from an acidic solution in which are present ferrous ions and metallic iron by introducing seed crystals (usually obtained by air-oxidation of ferrous hydroxide) into the solution and effecting air-oxidation under an acidic condition with sulfuric acid. The reduction of goethite gives magnetite as acicular crystals, and γ-hematite is obtained by mild oxidation of the magnetite. As is known, it is also possible to obtain ferric hydroxide, and hence ferric oxide, from a basic solution, but almost always an acidic solution is employed for the preparation of ferric oxide particles, so far as the production of an iron powder for magnetic recording use is intended, because of far more ease in controlling the means and distribution of the particle size of the oxide. When the production of an iron alloy powder is intended, an oxide powder comprising all the metal components of the alloy is prepared either by the use of a coprecipitation technique or by the accomplishment of metal-adsorption at the stage of forming goethite, α-hematite, magnetite or γ-hematite.

In the description given hereinafter, the term "oxide" will be used in the meaning of not only an anhydrous oxide but also a hydrated oxide and a hydroxide.

A magnetic metallic powder can be obtained by heating an oxide powder thus prepared in a reducing atmosphere, usually in a hydrogen gas atmosphere, at temperatures above about 250° C. Upon completion of the heating, the metallic powder is immersed in an organic liquid, avoiding a direct contact with air in the dry state. Alternatively, the metallic powder may be fully moistened with an organic liquid before exposure to air by introducing the vapor of the liquid into the heating chamber upon completion of the heating. Various organic liquids including hydrocarbons, ketones, esters and alcohols are useful for this purpose with the condition of containing little water, but it is convenient to utilize a liquid which serves as a dispersion medium for the application of the metallic powder to a base at the subsequent stage of producing a magnetic recording medium.

The wet metallic powder is dispersed in an organic liquid together with an organic polymer as a binder and some optional additives including a dispersing agent to give a magnetic paint of a suitable concentration and viscosity. A magnetic recording medium such as a recording tape is produced by uniformly applying this paint to a base of a nonmagnetic material such as a polyester film, drying the paint-coated base to form a strongly adhered thin magnetic layer and then smoothing the surface of the magnetic layer by a calendering or rolling procedure. The film thus coated is cut into a definite width so as to serve for an intended purpose.

For magnetic recording medium of this type, the chemical stability of the metallic powder in the magnetic coating, particularly its tendency of oxidation with the passage of time, is a matter of important concern other than the commonly noted physical properties of the recording medium including static magnetic characteristics and electromagnetic conversion characteristics. If the metallic powder undergoes oxidation by air with the lapse of time, there occurs significant deterioration in the magnetic properties as a natural consequence so that the recording medium becomes unserviceable. A magnetic recording medium which lacks stability in air is practically of little value even though it allows a high density recording in a fresh state.

Unfortunately a serious problem confronting a practical use of a finely divided iron powder in magnetic recording media is the lack of resistance to oxidation of the powder. In the form of very fine (submicron) particles as is required for the magnetic recording use, iron reacts with oxygen in air so readily that the metallic particles turn into a fully oxidized state through spontaneous combustion. Until now, therefore, various methods have been proposed to prevent or suppress the air-oxidation of powdery iron, but without full success from practical viewpoints.

One of the known countermeasures to the oxidation is the passivation of an iron powder itself by the addition of a small amount of a certain oxidation-resistant metal. It is inevitable, however, that the magnetic properties of the iron powder are sacrificed to a significant extent when any metal is added in an amount sufficient for producing a substantial anti-oxidation effect.

As a method of protecting a metallic powder against oxidation without unfavorable influences on the magnetic properties, it has been proposed to render the surfaces of the particles inactive to oxygen by a certain after-treatment. Typical examples of this method are the treatment of the powder with a surface-active agent to cover the surfaces of individual particles with a monomolecular layer of the agent and the adsorption of chromic ions on the particle surfaces, but none of these techniques is effective to a practical satisfaction.

Furthermore, it has been tried to render a magnetic coating, not a metallic powder itself, resistant to oxidation by augmenting the binding force of a polymer binder which serves as a dispersion medium for the powder after the evaporation of the organic solvent thereby to inhibit the intrusion of oxygen into the magnetic coating. It is impossible, however, to completely prevent the access of oxygen to the powder in the coating through interstices among molecular chains of the polymer so that the inherently oxidizable powder is not fully protected against oxidation.

It is an object of the present invention to provide a finely divided metallic powder comprising iron, and optionally, one or more other metals, which powder exhibits a saturation magnetization great enough to serve as the material of the magnetic recording media for high density recording purposes and is excellent in stability, particularly in the resistance to oxidation by air.

It is another object of the invention to provide an improved magnetic recording medium consisting of a nonmagnetic base and a thin magnetic layer comprising a metallic powder according to the invention, which recording medium serves for high density recording purposes and has the ability of long retaining its excellent physical properties.

A magnetic powder according to the invention is a metallic powder comprising iron and, optionally, at least one other metal, which powder is obtained by the reduction of a metal oxide powder with a pH value not smaller than 6.0 whose metal component corresponds to the composition of the metallic powder. The saturation magnetization of the metallic powder is greater than about 150 emu/g at room temperature.

A metal oxide powder obtained from a basic solution is useful as the material of a metallic powder according to the invention. This oxide powder may optionally be treated in an acidic liquid phase environment before the reduction so far as the pH value of the acid-treated powder remains in the above specified range. A metal oxide powder precipitated from an acidic solution and thereafter treated in a basic liquid phase environment so as to have the above required pH value also is useful in the present invention.

The metallic powder may contain less than about 15 Wt% of oxygen and preferably has an acicular particle shape with a mean length of about 0.3–0.5 μm and a mean length-to-width ratio of about 7:1 to about 10:1.

Preferred examples of metals useful in the present invention for alloying with iron are cobalt, nickel, manganese and chromium.

In the production of a magnetic recording medium, the above described metallic powder is dispersed in an organic liquid together with an organic polymer which is soluble in the organic liquid and serves as a binder. Optionally use will be made of a dispersing agent and other commonly used additives in preparing this dispersion, a magnetic paint. A thin magnetic layer is laid on a base of a nonmagnetic material by the application of this magnetic paint to the base, followed by drying and calendering procedures. A magnetic recording medium thus produced does not differ in construction from conventional magnetic recording media: in the dried magnetic coating, the metallic powder is dispersed in the solidified polymer binder. This recording medium, however, is excellent both in its magnetic characteristics represented by the maximum magnetic flux density and coercive force and in its chemical and physical stability represented by resistance to oxidation (rusting) in a high temperature, high humidity atmosphere and the rate of variation in the maximum magnetic flux density $Bm$ with the lapse of time. In the present invention, this rate of variation is made less than 5% of an initial value for $Bm$ after the maintenance of the recording medium for 340 hr in a 90% relative humidity atmosphere at a temperature of 80° C. Accordingly this recording medium is fully practicable and can serve high density recording purposes.

The invention is based on our discovery that the chemical stability, i.e. resistance to air-oxidation, of a finely divided iron powder greatly depends on the pH of an oxide powder the reduction of which gives the iron powder. Of course the pH of the oxide powder is principally determined by the acidity or basicity of a liquid phase environment employed in the preparation of the oxide powder.

First we have recognized that an iron powder obtained by the reduction of a ferric oxide powder which is prepared in a basic environment and has a pH value larger than 7 is far more resistant to oxidation than another iron powder obtained from a more familiar ferric oxide powder which is prepared in an acidic environment and has a pH value smaller than 7. A liquid phase basic environment refers to a basic solution given by the introduction of an alkaline material such as sodium hydroxide, potassium hydroxide, calcium hydroxide, ammonia or an amine into a solvent such as water, an alcohol, a ketone and/or an ester. When an amine is used as a solvent, a basic environment is realized without the need of adding any extra alkaline substance. As a typical example of the preparation of goethite in a basic environment, an alkali solution such as a sodium hydroxide solution is added to an aqueous solution containing ferrous ions (usually a ferrous sulfate solution) to keep the pH of the resultant solution well above 7 with continued blowing of air into the solution. This method gives a crystalline goethite of a good acicular shape with excellent purity, but it is rather difficult to control the length of the goethite particles in this method. The preparation of goethite using an acidic solution has the advantage of ease in controlling the particle size, but twin particles tend to grow and the product is liable to contain a basic iron sulfate such as $NaFe_3(OH)_6(SO_4)_2$. These differences between the two types of preparation methods might make certain contribution to a difference between ferric oxide originated from a basic solution and the oxide from an acidic solution.

Furthermore, our extensive experimental works have revealed the following facts. A ferric oxide powder prepared in a basic environment gives a stable iron powder even when the oxide powder is treated in an acidic liquid phase environment before the reduction so long as the pH of the acid-treated oxide powder is either larger than 7 or within the range between 6.0 and 7.0. The measurement of the pH of the oxide powder is accomplished according to JIS K 5101-64, generally corresponding to ASTM-D-1208-65T, and there is a need of thoroughly washing a sampled portion of the oxide powder treated in the acidic environment, followed by air-drying and heating prior to the measurement. The intermediate treatment of a basic ferric oxide powder in an acidic environment is effected when, for example, it is desired to obtain an iron powder with specific magnetic properties.

Also it is possible to obtain a stable iron powder from an acidic ferric oxide powder prepared in an acidic environment by treating the oxide powder in a liquid phase basic environment prior to the reduction by heating. This treatment is accomplished with the aim of either removing acidic matter from the metal oxide powder, which has been occluded therein since its formation or growth in the acidic environment, or causing the oxide powder to adsorb basic matter in a quantity larger than the quantity of the occluded acidic matter. However, the adsorption of an excessively large quantity of basic matter should be avoided because of a possible and unfavorable influence of the adsorbed matter on the polymer binder at the preparation of a magnetic paint. Prior to this treatment for reforming the acidic oxide powder into a basic oxide powder, the acidic oxide powder must be subjected to a thorough washing process, in which the powder is completely dispersed in a suitable liquid such as hot water to undergo repeated washing and finally heated for 1-4 hr in air or an inert gas such as nitrogen at temperatures between about 250 and 450° C., usually preceded by drying in the same atmosphere for evaporation of the liquid. The object of this reforming process is achieved when the pH of the alkalitreated oxide powder is not smaller than 6.0, meaning that the treated oxide powder needs not to be apparently basic when the measurement of the pH is preceded by the above described pretreatment including a heat treatment.

Sometimes the alkali-treated oxide powder exhibits a pH value smaller than 6.0 probably for the following reason. There is a chance of acidic matter remaining in the deep interior of the alkali-treated oxide powder although basic matter is adsorbed on the surfaces of the particles. If the retained acid matter is in excess of the adsorbed basic matter, the latter will be entirely consumed by reaction with the former at the pretreatment so that the pH measurement gives a pH value smaller than 6.0. In this case, the reduction of the alkali-treated oxide powder does not give a stable iron powder.

To summarize, a metallic powder featuring a satisfactory resistance to oxidation can be obtained only when an oxide powder to be reduced has a pH value not smaller than 6.0, and it is a requisite to the pH measurement that the oxide powder is thoroughly washed and heated in advance of the measurement.

As mentioned hereinbefore, not only an anhydrous oxide of iron but also a hydrated oxide and a hydroxide can be used as the material to be reduced into a metallic powder according to the invention. Such an oxygen-containing powdery material is usually prepared by precipitation from a solution. However, it is also possible to obtain such a material by first preparing a suspension of an oxide powder in a suitable dispersion medium and then introducing one or more kinds of metal ions into the suspension to be adsorbed by the suspended powder. As a modification, the metal ions may be introduced into the suspension together with a precipitant for the metal ions so as the cause deposition of a precipitate on the surfaces of the suspended particles.

A magnetic recording medium according to the invention does not differ from conventional magnetic recording media except for the use of a metallic powder obtained by the reduction of the above described basic oxide powder. The metallic powder is dispersed in a commonly used polymer binder. In the case of a magnetic recording medium for ordinary use, a relatively soft or uncurable polymer binder such as a PVC-base binder is usually employed. For a recording medium requiring a high durability such as a videotape, the use of a curable polymer binder such as an epoxy-base or a urethane-base binder is more prevailing. The selection of a polymer binder in this invention is made on the same basis.

The invention will be illustrated by the following examples, supplemented by comparative references.

EXAMPLE 1

Figure 1:
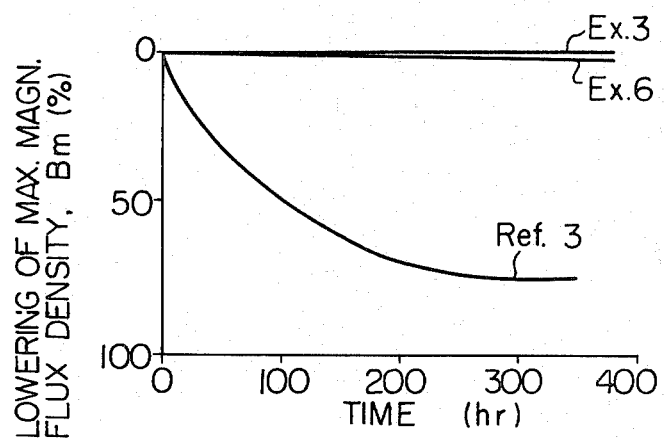
FIG. 1 is a graph showing the rate of variation in the maximum magnetic flux density with the lapse of time at an elevated temperature for three differently produced iron powders.

A powder of gamma hematite $\gamma$-$Fe_2O_3$ was obtained from goethite $\alpha$-$Fe_2O_3 \cdot H_2O$ prepared in a basic liquid phase environment (a sodium hydroxide solution was added to a ferrous sulfate solution) through reduction and a succeeding mild oxidation. The pH of $\gamma$-hematite powder was 8.2 (The pH measurement was made according to JIS K 5101-64 in all Examples and References). The reduction of this $\gamma$-hematite powder in a hydrogen gas stream at about 350° C. gave a finely divided metallic powder, which had an acicular particle shape and contained about 13% by weight of oxygen. The saturation magnetization $\sigma_s$ of this metallic powder was 158 emu/g at room temperature.

A magnetic paint was prepared by dispersing 100 parts by weight of the metallic powder together with 25 parts by weight of a conventional polymer binder, 2 parts by weight of a dispersing agent and 3 parts by weight of other commonly used additives for lubrication and endurance purposes in 300 parts by weight of an organic solvent. This paint was applied to a polyester film, followed by drying, to given an 1.4 μm thick magnetic coating. For the thus produced magnetic recording medium, the maximum magnetic flux density Bm was 3350 G and the coercive force Hc was 600 Oe. This magnetic recording medium was kept placed in an environmental test chamber maintained at a relative humidity of 90% and at a temperature of 80° C. to examine its resistance to oxidation by air. The measurement of the magnetic properties was repeated after the lapse of 170 hr and 340 hr from the start of the environmental test, with the result that substantially no change occurred in any of the above presented characteristics. The appearance of the magnetic coating too remained unchanged when the test was continued for 340 hr.

EXAMPLE 2

A Co-containing $\gamma$-$Fe_2O_3$ powder was prepared using a basic liquid phase environment. The amount of Co in this oxide powder was 5.4% by weight of the total of Fe and Co, and the pH of this powder was 8.6. The reduction of this material in a hydrogen gas stream gave a metallic powder, which was essentially an Fe-Co alloy with a saturation magnetization value $\sigma_s$ of 152 emu/g at room temperature.

Using this alloy powder, a magnetic recording medium was produced by the procedures described in Example 1. The maximum magnetic flux density Bm for this recording medium was 2970 G and the coercive force Hc was 720 Oe. When this recording medium was maintained for 170 hr in a 90% relative humidity atmosphere at a temperature of 80° C., neither the magnetic characteristics nor the appearance of the magnetic coating exhibited any substantial variation.

EXAMPLE 3

This example too used a Co-containing $\gamma$-$Fe_2O_3$ powder originating from a basic liquid phase environment as an oxide powder to be reduced. In this case the amount of Co in the oxide powder was 3% by weight of the total of Fe and Co, and the powder exhibited pH value of 9.1. An essentially Fe-Co alloy powder was obtained by the reduction of this oxide powder in hydrogen. The saturation magnetization $\sigma s$ of this alloy powder at room temperature was 158 emu/g. For a magnetic recording medium produced in accordance with Example 1 by the use of this alloy powder, the maximum magnetic flux density Bm was 3200 G and the coercive force Hc was 820 Oe. This magnetic recording medium was subjected to the environmental test described in Example 1. No change occurred in the appearance of the magnetic coating surface or in the coercive force after the lapse of 340 hr, but the maximum magnetic flux density Bm lowered to 99% of the initial value (3200 G) after the lapse of 340 hr.

EXAMPLE 4

A powder of a Co-$\gamma$-$Fe_2O_3$ system prepared by a coprecipitation technique in a basic solution was dispersed in water and admixed with a solution containing cobalt ions. Then sodium hydroxide was added to this mixture to make the pH of the reaction system larger than 10. A resultant precipitate was separated from the mother liquor by filtration. After washing with water and air-drying, the precipitate was heated for 3 hr in air at a temperature of about 350° C. The pH of the thus treated oxide powder was 9.5, and the amount of Co was 20 Wt% of the total of Fe and Co. The reduction of this oxide powder by heating in hydrogen gave a metallic powder essentially of an Fe-Co alloy with the saturation magnetization $\sigma s$ of 179 emu/g and the coercive force Hc of 1050 Oe. A magnetic recording medium produced according to Example 1 by the use of this alloy powder exhibited the maximum magnetic flux density Bm of 3840 G. The environmental test of Example 1 was conducted on this recording medium for 340 hr. The maximum magnetic flux density Bm lowered to 99% of the initial value, but the appearance of the magnetic coating surface remained unchanged.

EXAMPLE 5

A powder of a Co-$\gamma$-$Fe_2O_3$ system (Co was 4 Wt% of the total of Fe and Co, pH was 3.5) prepared in an acidic liquid phase environment was washed with water, air-dried and then subjected to a 350° C., 4 hr heat treatment. Thereafter a suspension of this powder in water was prepared. To achieve a thorough dispersion, the suspension was first agitated and then passed through a micro-filter. Then sodium hydroxide was added to the suspension to make the pH above 10, followed by vigorous stirring at 40°-50° C. Thereafter, the suspension was left standing for a sufficiently long time to allow settling of the perticles. Then the particles were filtered out, washed, air-dried and finally heated in air for 4 hr at 350° C. The pH of the oxide powder after these treatments was 7.3. A metallic powder obtained by the reduction (heating in hydrogen) of this oxide powder exhibited a saturation magnetization value $\sigma s$ of 169 emu/g at room temperature. The production of a magnetic recording medium was carried out as in Example 1. The environmental test of Example 1 was conducted for 170 hr on the recording medium of this example. The maximum magnetic flux density Bm of the recording medium at the end of this environmental test was 3380 G, corresponding to 98% of a value observed before the test. The surface of the magnetic coating showed no change.

REFERENCE 1

A powder of $\gamma$-$Fe_2O_3$ (pH was 3.5) prepared in an acidic environment was dispersed in water. A solution containing cobalt ions was admixed with the dispersion, followed by the addition of sodium hydroxide to make the pH above 10, and stirring was continued for 2 hr. Thereafter the oxide particles were filtered out, washed, air-dried and finally heated in air for 4 hr at 350° C. When cooled to room temperature, the pH of the powder was 4.8 and the amount of Co in the powder was 20 Wt% of the total of Fe and Co. The reduction of this oxide powder into a metallic powder was performed by heating in hydrogen. The saturation magnetization $\sigma s$ for this metallic powder was 160 emu/g. For a magnetic recording medium produced by the use of this metallic powder through the procedures of Example 1, the maximum magnetic flux density Bm was 3230 G and the coercive force Hc was 600 Oe. When this recording medium was maintained in a 90% relative humidity atmosphere for 170 hr at 80° C., the maximum magnetic flux density Bm became only 33% of the initial value. Besides, the magnetic coating had gathered red-brown rust over the entire area.

REFERENCE 2

An acidic solution containing ferric ions and cobalt ions was mixed with a solution of sodium boron hydride $NaBH_4$ in a DC magnetic field to precipitate a powdery Fe-Co alloy. The dehydration of the precipitate and a solvent replacement were accomplished by the use of methanol and acetone. The saturation magnetization $\sigma s$ for this precipitate was 150 emu/g. A magnetic paint was prepared by dissolving a polymer binder in the resultant dispersion, and a magnetic recording medium was produced by the application of this paint to a polyester film. The maximum magnetic flux density Bm for this recording medium was 2630 G. The environmental test of Example 1 was conducted on this recording medium with the result that the maximum magnetic flux density Bm lowered to 92% of the initial value after the lapse of 170 hr and to 91% upon completion of the 340 hr test. Meanwhile, the surface of the magnetic coating was already rusted to such an extent as recognizable by the naked eye when examined after the lapse of 170 hr from the start of the test.

REFERENCE 3

A powder of a Co-$\gamma$-$Fe_2O_3$ system (Co was 4 Wt% of the total of Fe and Co, pH was 4.8) was prepared from goethite which was formed in an acidic environment with the coprecipitation of Co. This oxide powder was reduced by heating in hydrogen to give an alloy powder which exhibited a saturation magnetization value of 169 emu/g. The production of a magnetic recording medium using this alloy powder was performed according to Example 1. The maximum magnetic flux density Bm for this recording medium was 3590 G and the coercive force Hc was 700 Oe. This recording medium was maintained in a 90% relative humidity atmosphere at 40° C. with the result that rusting on the surface of the magnetic coating was recognized by naked eyes after the lapse of only 48 hr.

For the recording media of Example 3, Example 6 and Reference 3, FIG. 1 shows the extent of a lowering in the maximum magnetic flux density Bm with the lapse of time in a 90% relative humidity atmosphere at 80° C. (but 40° C. for Reference 3). The lowering in Bm is given in percentage of an initial value (before the test).

Figure 2:
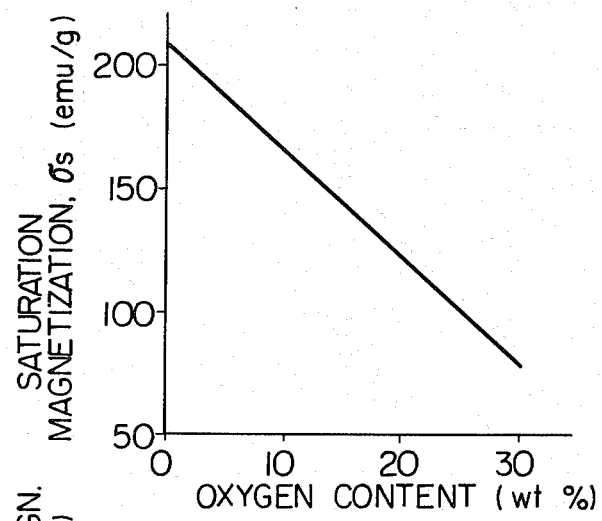
FIG. 2 is a graph showing the relationship between the oxygen content of a partially oxidized iron powder and the saturation magnetization of the powder.

In the present invention the lower limitation to the saturation magnetization $\sigma$s for a metallic powder is set at 150 emu/g at room temperature since a saturation magnetization value larger than about 150 emu/g is a requisite to the realization of a substantial enhancement of recording density from a level attained by currently utilized ferromagnetic powder materials. The saturation magnetization $\sigma$s increases as the reduction of an oxide powder approaches completion. FIG. 2 shows this relation for the reduction of ferric oxide (which contains 30% oxygen). As can be seen in FIG. 2, there is a need of performing the reduction in this case until the oxygen content of the reduced powder becomes less than about 15 Wt.% to meet the aforementioned saturation magnetization requirement.

EXAMPLE 6

A $\gamma$-Fe$_2$O$_3$ powder was prepared from goethite formed by an alkaline reaction through reduction and a suceeding mild oxidation. The hematite powder was sufficiently washed and then immersed in a dilute acidic solution of pH 3-4, resulting in that the pH of the powder decreased to 6.4. The reduction of the acid-treated hematite powder by heating in hydrogen gave a metallic powder with a saturation magnetization value of 156 emu/g. Using this metallic powder, a magnetic recording medium was produced in the same manner as in Example 1. The maximum magnetic flux density Bm was 3390 G and the coercive force Hc was 840 Oe. After the maintenance of the recording medium in a 90% relative humidity atmosphere for 170 hr at 40° C., the maximum magnetic flux density Bm was 98% of the initial value. There occurred no further lowering in Bm when the environmental test was extended by another 170 hr. The appearance of the magnetic coating showed no change at that moment and still after the lapse of additional 170 hr.

EXAMPLE 7

A $\gamma$-Fe$_2$O$_3$ powder obtained from goethite formed by an alkaline reaction was washed well and then immersed in an acidic solution. The pH of the acid-treated hematite powder was 7.1. For a metallic powder obtained by the reduction (heating in hydrogen) of this hematite powder, the saturation magnetization $\sigma$s was 170 emu/g. When this metallic powder was used in the production of a magnetic recording medium according to Example 1, the maximum magnetic flux density Bm was 3750 G and the coercive force Hc was 860 Oe. A 170 hr storage of this recording medium in a 90% relative humidity atmosphere at 40° C. caused the maximum magnetic flux density Bm to lower by 2% but did not cause any change in the appearance of the magnetic coating.

As demonstrated by the foregoing examples, a magnetic recording medium according to the invention is remarkably resistant to rust, i.e. oxidation, and exhibits only a few percent, or less, lowering in the maximum magnetic flux density Bm when subjected to the environmental test extending for 340 hr. It can be judged from these experimental results that a magnetic recording medium according to the invention has a sufficiently long service life with little change in its excellent characteristics.

Figure 3:
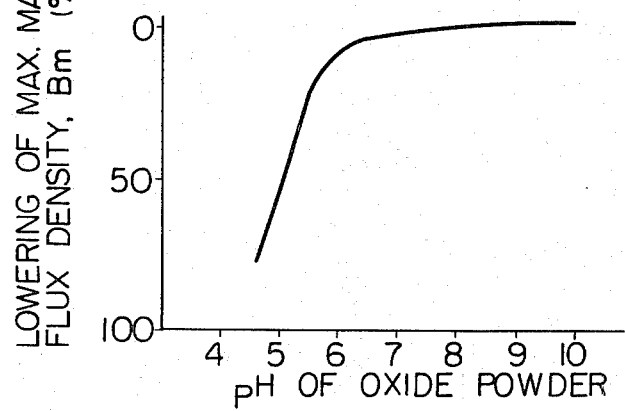
FIG. 3 is a graph showing the rate of variation in the maximum magnetic flux density of an iron powder as the function of the pH of an ferric oxide powder from which the iron powder is obtained.

The data of the maximum magnetic flux density Bm in Examples 1-7 and Reference 1-3 show that the extent of a lowering in Bm (in percent of an initial value) caused by the maintenance of a recording medium in a 90% relative humidity atmosphere for 170 hr at 80° C. (in some cases at 40° C.) depends on the pH of an oxide powder used as the essential material as graphically presented in FIG. 3.

What is claimed is:

1. An oxidation resistant magnetic metallic powder comprising iron and optionally at least one other ferromagnetic metal, said magnetic metallic powder having a saturation magnetization at room temperature greater than about 150 emu/g, said metallic powder having been prepared by the reduction of a metal oxide powder whose metal component corresponds to the composition of the metallic powder, the pH of said metal oxide powder being not less than about 6.0 wherein said reduction is performed by heating the metal oxide powder in a reducing gas atmosphere.

2. A metallic powder as claimed in claim 1, wherein said metal oxide powder is immersed in an acidic solution prior to the reduction thereof into the metallic powder.

3. A metallic powder as claimed in claim 1, wherein said metal oxide powder is a ferric oxide powder.

4. A metallic powder as claimed in claim 1, wherein said metal oxide powder contains Fe and at least one other metal selected from the group consisting of Co, Ni, Mn and Cr.

5. A metallic powder as claimed in claim 1, wherein the metal component of said metal oxide powder consists of Fe and Co.

6. A metallic powder as claimed in claim 1, wherein said reducing gas atmosphere is a hydrogen gas stream.

7. An oxidation resistant magnetic metallic powder comprising iron and optionally at least one other ferromagnetic metal, said magnetic metallic powder having a saturation magnetization at room temperature greater than about 150 emu/g, said metallic powder having been prepared by the reduction of a metal oxide powder whose metal component corresponds to the composition of the metallic powder, said metal oxide powder having been prepared in a basic liquid phase environment, the pH of said metal oxide powder having not less than about 6.0, wherein said reduction is performed by heating the metal oxide powder in a reducing gas atmosphere.

8. A metallic powder as claimed in claim 7 wherein said metal oxide powder contains Fe and at least one other metal selected from the group consisting of Co, Ni, Mn and Cr.

9. A metallic powder as claimed in claim 7 wherein the metal component of said metal oxide consists of Fe and Co.

10. An oxidation resistant magnetic metallic powder comprising iron and optionally at least one other ferromagnetic metal, said magnetic metallic powder having a saturation magnetization at room temperature greater than about 150 emu/g, said metallic powder having been prepared by the reduction of a metal oxide powder whose metal component corresponds to the composition of the metallic powder, said metal oxide powder having been prepared in an acidic liquid phase environment, then washed and heated at temperatures between about 250° C. and 450° C. and thereafter immersed in a basic solution, the pH of said metal oxide powder being not less than about 6.0, wherein said reduction is performed by heating the metal oxide powder in a reducing gas atmosphere.

11. A metallic powder as claimed in claim 10 wherein said metal oxide powder contains Fe and at least one other metal selected from the group consisting of Co, Ni, Mn and Cr.

12. A magnetic metallic powder as claimed in claim 10 wherein the metal component of said metal oxide consists of Fe and Co.

13. A magnetic recording medium comprising a base of a nonmagnetic material and a thin magnetic layer laid on a surface of said base, said magnetic layer being a dispersion of a magnetic metallic powder comprising iron and optionally at least one other ferromagnetic metal in a solidified polymer binder, said magnetic metallic powder having a saturation magnetization at room temperature greater than about 150 emu/g, said metallic powder having been prepared by the reduction of a metal oxide powder whose metal component corresponds to the composition of said metallic powder, the pH of said metal oxide powder being not less than about 6.0, wherein said reduction is performed by heating the metal oxide powder in a reducing gas atmosphere.

14. A magnetic recording medium as claimed in claim 13, wherein said base is a film of a synthetic resin.

15. A magnetic recording medium as claimed in claim 13, wherein the extent of a variation in the maximum magnetic flux density for said magnetic layer caused by the maintenance of the recording medium in a 90% relative humidity atmosphere for 340 hr at a temperature of about 80° C. is less than 5% of a initial value obtained before the introduction of the recording medium into said atmosphere.

16. A magnetic recording medium as claimed in claim 15, wherein said magnetic layer is formed by the application of a dispersion of said metallic powder in an organic solvent containing said polymer dissolved therein.

17. A magnetic recording medium as claimed in claim 16, wherein said other ferromagnetic metal is selected from the group consisting of Co, Ni, Mn and Cr.

18. A magnetic recording medium as claimed in claim 13, wherein said reducing gas atmosphere is a hydrogen gas stream.

19. A magnetic recording medium comprising a base of a nonmagnetic material and a thin magnetic layer laid on a surface of said base, said magnetic layer being a dispersion of a magnetic metallic powder comprising iron and optionally at least one other ferromagnetic metal in a solidified polymer binder, said magnetic metallic powder having a saturation magnetization at room temperature greater than about 150 emu/g, said metallic powder having been prepared by the reduction of a metal oxide powder whose metal component corresponds to the composition of the metallic powder, said metal oxide powder having been prepared in a basic liquid phase environment, the pH of said metal oxide powder being not less than about 6.0, wherein said reduction is performed by heating the metal oxide powder in a reducing gas atmosphere.

20. A magnetic recording medium comprising a base of a nonmagnetic material and a thin magnetic layer laid on a surface of said base, said magnetic layer being a dispersion of a magnetic metallic powder comprising iron and optionally at least one other ferrogmagnetic metal in a solidified polymer binder, said magnetic metallic powder having a saturation magnetization at room temperature greater than about 150 emu/g, said metallic power having been prepared by the reduction of a metal oxide powder whose metal component corresponds to the composition of the metallic powder, said metal oxide powder having been prepared in an acidic liquid phase environment, then washed and heated at temperatures between about 250° C. and 450° C. and thereafter immersed in a basic solution, the pH of said metal oxide powder being not less than about 6.0, wherein said reduction is performed by heating the metal oxide powder in a reducing gas atmosphere.

21. A method for the production of an oxidation resistant magnetic metallic powder comprising iron and optionally at least one other ferromagnetic metal comprising the steps of preparing a metal oxide powder whose metal component corresponds to the composition of the metallic powder, said metal oxide powder having a pH not less than about 6.0 and reducing said metal oxide powder by heating same in a reducing gas atmosphere until the saturation magnetization of the resultant magnetic metallic powder is greater than about 150 emu/g.

22. The method of claim 21, wherein said reducing gas atmosphere is a hydrogen gas stream.

23. The method of claim 21, wherein the metal oxide powder is prepared in a basic liquid phase environment.

24. The process of claim 22 comprising the additional step of immersing the metal oxide powder in an acidic solution prior to its reduction.

25. The method of claim 21, wherein the preparation of the metal oxide powder is accomplished in an acidic liquid phase environment and comprising the additional step of immersing said metal oxide powder in a basic solution prior to its reduction.

26. The method of claim 25 comprising the additional steps of washing the metal oxide powder and heating same at a temperature from about 250° to about 450° C. prior to its immersion in the basic solution.

* * * * *